(12) United States Patent
Casey (10) Patent No.: US 9,774,948 B2
(45) Date of Patent: Sep. 26, 2017

(54) SYSTEM AND METHOD FOR AUTOMATICALLY REMIXING DIGITAL MUSIC

(75) Inventor: Michael Casey, Hanover, NH (US)

(73) Assignee: THE TRUSTEES OF DARTMOUTH COLLEGE, Hanover, NH (US)

( * ) Notice: Subject to any disclaimer, the term of this patent is extended or adjusted under 35 U.S.C. 154(b) by 609 days.

(21) Appl. No.: 13/580,072

(22) PCT Filed: Feb. 18, 2011

(86) PCT No.: PCT/US2011/025527
§ 371 (c)(1),
(2), (4) Date: Mar. 5, 2013

(87) PCT Pub. No.: WO2011/103498
PCT Pub. Date: Aug. 25, 2011

(65) Prior Publication Data
US 2013/0170670 A1    Jul. 4, 2013

Related U.S. Application Data

(60) Provisional application No. 61/305,876, filed on Feb. 18, 2010.

(51) Int. Cl.
*H04R 3/00* (2006.01)
*G11B 27/28* (2006.01)
(Continued)

(52) U.S. Cl.
CPC ............. *H04R 3/00* (2013.01); *G11B 27/034* (2013.01); *G11B 27/28* (2013.01)

(58) Field of Classification Search
USPC .................. 704/E19.009; 713/176
See application file for complete search history.

(56) References Cited

U.S. PATENT DOCUMENTS 5,918,223 A * 6/1999 Blum ................ G06F 17/30017
6,321,200 B1 * 11/2001 Casey .................... G10L 15/02
704/500
(Continued)

FOREIGN PATENT DOCUMENTS

JP      2009276776 A    11/2009
WO   2005093623 A1   10/2005

OTHER PUBLICATIONS

International Search Report and Written Opinion issued in related PCT Patent Application PCT/US2011/025527, dated Oct. 21, 2011, 9 pages.

*Primary Examiner* — Duc Nguyen
*Assistant Examiner* — Yogeshkumar Patel
(74) *Attorney, Agent, or Firm* — Lathrop Gage LLP (57) ABSTRACT

Systems and methods augment a target media with a plurality of source media. The target media and source media are processed to form time frequency distributions (TFDs). Target features are extracted from the associated TFD and source features are extracted from each of the associated source TFDs. The target features are segmented into temporal portions that are compared with each of the plurality of source features to determine one or more matched source features having nearest matches to the target feature segments. Portions of the source media associated with the matched source features are mixed with the target media to form an augmented target media, wherein the mixing is based upon a probabilistic mixing algorithm that uses a distance between the matched target feature and source features to define an amplitude of each portion of the source media.

29 Claims, 6 Drawing Sheets

(51) Int. Cl.
  *G11B 27/034*  (2006.01)
  *G10L 19/018*  (2013.01)
  *H04N 21/8358*  (2011.01)
  *H04N 21/84*  (2011.01)
  *H04N 21/462*  (2011.01)
  *G06F 17/30*  (2006.01)
  *G06T 1/00*  (2006.01)

(56) References Cited

U.S. PATENT DOCUMENTS

| | | | |
|---|---|---|---|
| 6,675,174 B1* | 1/2004 | Bolle | G06F 17/30802 |
| 8,855,334 B1* | 10/2014 | Lavine | H04M 19/04 |
| | | | 381/119 |
| 2003/0004883 A1* | 1/2003 | Koyata | G06Q 30/06 |
| | | | 705/51 |
| 2004/0054542 A1 | 3/2004 | Foote et al. | |
| 2008/0127812 A1* | 6/2008 | Sako | H04N 21/6547 |
| | | | 84/625 |
| 2008/0221906 A1* | 9/2008 | Nilsson | G10L 21/0364 |
| | | | 704/500 |
| 2009/0158318 A1* | 6/2009 | Levy | G06F 21/125 |
| | | | 725/32 |
| 2010/0115542 A1* | 5/2010 | Lee | G06K 9/0053 |
| | | | 725/19 |

* cited by examiner

SYSTEM AND METHOD FOR AUTOMATICALLY REMIXING DIGITAL MUSIC

RELATED APPLICATIONS

This application claims priority to U.S. Provisional Application No. 61/305,876, filed Feb. 18, 2010, incorporated herein by reference.

BACKGROUND

Audio signal separation and recombination are known in the art of audio mixing. For example, blind signal separation identifies and extracts source signals from a mix of those signals. Software packages may operate under user control to combine portions of two or more audio signals together. However, analysis methods for separation of audio and automatic separation and/or recombination of the audio are typically complex and tend to not produce coherent remixes or mashups.

SUMMARY OF THE INVENTION

A method for generating a transformed digital media from a target media and one or more source media. The method includes decoding the digital media, forming a time frequency distribution of the digital media, extracting musical features from the digital media, segmenting the target's feature extracted digital media, comparing each segment of the target digital media's extracted features with the source's extracted features, generating a 3-tuple (triple) for each substantial match, and generating the transformed digital media using the closest matches defined by the triples.

In one embodiment, a method generates a transformed digital media. A target media file and one or more source media files are decoded into a plurality of target sample sets and source sample sets. The target sample set is processed to form a target time frequency distribution (TFD) and the source sample sets are processed to form at least one source TFD. Musical features are extracted from the target TFD to generate target feature extraction (FE) data containing one or more separate target features, and musical features are extracted from the source TFD to generate source FE data containing one or more separate source features, and assigning each of the source features a media ID for identifying the associated source. The target FE data is segmented into temporal portions to form a plurality of target feature segments for each target feature, each of the target feature segments being time aligned to a corresponding target feature. Each of the target feature segments is compared with a plurality of the source features and generating a triple for each substantial match between the target feature segment and one of the source features, the triple including (id, s, d), where id is the media ID, s is a location within the source, d is the distance of the matched source to the respective target segment. The transformed media is generated from the target sample sets and the source sample sets based upon the triples according to a probabilistic mixing algorithm based on a match distance function.

In another embodiment, a method generates a transformed digital media from a target media and one or more source media. The target media and the source media are decoded. A first time frequency distribution for the target media and a second time frequency distribution for each of the source media are generated. A plurality of first musical features is extracted from the first time frequency distribution and a plurality of second musical features is extracted from each of the second time frequency distributions. The first musical features are segmented into a plurality of temporal segments and the first musical features of each of the plurality of temporal segments are compared with the second musical features to generate substantial matches. A triple is generated for each of the substantial matches and the transformed digital media is generated by mixing the target media and portions of the source media identified by the triples.

In another embodiment, a method generates a transformed media by re-synthesizing one or more time frequency distribution (TFD) processed media features and combining with a target media. A reverse TFD process is performed on one or more musical features extracted from at least one source media to generate a re-synthesized audio feature having a reduced amount of extraneous audio elements. The re-synthesized audio feature is combined with the target media to generate the transformed media.

In another embodiment, a method mixes at least one source media with a target media. Matches between each of a plurality of time segmented portions of the target media and each of a plurality of time windowed portions of the source media are determined and a probabilistic distribution of N closest determined said matches is generated. For each of the N closest matches, a mixing coefficient based upon the generated probabilistic distribution is generated and the time windowed portions associated with the N closest matches are mixed with the associated time segmented portion using the associated mixing coefficients.

In another embodiment, a method augments a target media with a plurality of source media. The target media is processed to form a target time frequency distribution (TFD), and each of the source media is processed to form a plurality of source TFDs. Target features are extracted from the target TFD and source features are extracted from each of the source TFDs. The target features are segmented into temporal portions to form a plurality of target feature segments. Each of the target feature segments is compared with each of the plurality of source features to determine a matched source feature having a nearest match between each one of the source features and a respective one of the target feature segments. Portions of the source media associated with said matched source features are mixed with the target media to form an augmented target media, wherein the mixing is based upon a probabilistic mixing algorithm that uses a distance between the matched target feature and source feature to define an amplitude of each said portion of the source media.

In another embodiment, a method augments a target media with a plurality of source media. The target media is processed to form a target time frequency distribution (TFD), which are separated into a plurality of components. Target features are extracted from each of the components. Each of the source media are processed to form a plurality of source TFDs, which are separated into a plurality of source components. Source features are extracted from each of the source components. The target features are segmented into temporal portions to form a plurality of target feature segments, which are each compared with each of the source features to determine N closest matches. First audio portions of the target media corresponding to the target feature segment and second audio portions of the source media corresponding to the source segments of the N closest matches are mixed.

In another embodiment, a system automatically remixes digital music. The system includes a time-frequency distribution analyzer for processing (a) a target media to form a target time frequency distribution and (b) a plurality of source media to form a plurality of source time frequency distributions. The system also includes a feature extractor for (a) extracting target features from the target time frequency distribution and (b) extracting source features from each of the source time frequency distributions. A feature store within the system stories the target features and the source features. A segmenter of the system segments the target features into a plurality of temporal target segments, and a matcher matches, for each temporal target segment, a plurality of the source features nearest to the temporal target segment. A compiler of the system generates a transformed digital media based upon the target media and the matched source features.

In another embodiment, a method separates a media into a set of components. The media is processed using a short Fast Fourier Transform algorithm to form a time frequency distribution (TFD), which is separated into a plurality of components using a probabilistic latent component analysis algorithm. A sparseness of each of the components is determined and any one or more of the components that have said sparseness greater than a first threshold and less than a second threshold is removed, and the set of components includes the remaining components.

DETAILED DESCRIPTION OF THE FIGURES

The concepts found in this application expand on the system and method for extracting features from a mixture of signals and detecting temporally related portions of multimodal signals as described in the U.S. Pat. No. 6,321,200 granted Nov. 20, 2001, U.S. Pat. No. 7,218,755 granted May 15, 2007, and U.S. Pat. No. 7,318,005 granted Jan. 8, 2008, each of which is incorporated herein by reference. The paper, titled "iMatsh—method and apparatus for automatic audio sub-sequence deconstruction, matching and recombination for a novel music player device", which describes a novel base iMatsh system and method and its extension, is also included herein by reference.

Disclosed are systems and methods that create a transformed digital media, called an automatic matching-mashup, henceforth referred to as a matshup, of media which exists on a computing device, a matshup device. The matshup device utilizes a combination of audio analysis and computational processes to determine and extract features (base matshup system, FIG. 1-3) and/or feature-based component (extension to the base system, FIGS. 4-5), matching based on the extracted features or components and produce a mashup via mashup processes. That is, multi-dimensional time-series matching using extracted audio source features (FIGS. 1-3) or component (FIGS. 4-5) and subsequent re-combination of matched features or components is an aspect of the current invention and is an important arrangement for automatic production of a convincing mashups.

The current invention improves previous systems for polyphonic audio matching by isolating and extracting multiple separate audio components then matching and blending extracted audio components (feature and/or components) with a target media file based on an assigned probabilistic weight derived from a distance function. The improvement (extension to the base system, FIGS. 4-5) of isolating and extracting multiple separate audio components, which correspond approximately to perceptual sound objects (e.g., a guitar notes, vocal notes, base drum, snare, cymbal, etc.), can be performed on one or more physical transport channels, i.e. a mono, stereo or multi-channel mixture of sound sources. The isolated and extracted audio components can then be combined with, for example, a target track, to generate a convincing mashup, using a novel matching process disclosed herein. To improve component extraction, the present system and method extracts PLCA components, then extracts frequency and time marginal sparseness features from the components and clusters them into classes representing roles in music, for example, percussive and non-percussive roles. In one embodiment, by inverting the components in each cluster, offsetting them and mixing simultaneously occurring components in each class, separated audio tracks for each role are obtained.

Application to video media is a trivial extension of the application to audio media, with feature extraction and matching steps (described below) performed entirely on the audio part of a video stream. A re-combination process for video mixes audio signals and video signals to form an output video matshup.

Figure 1:
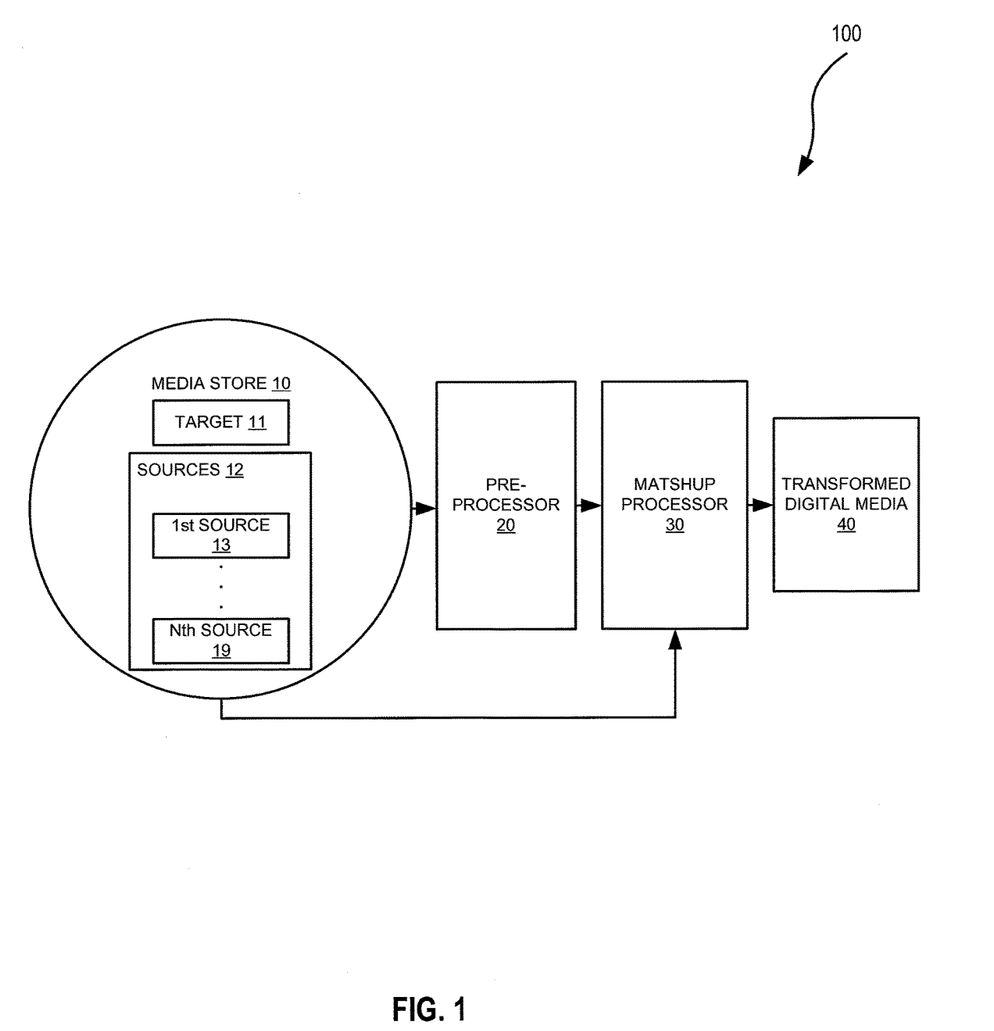
FIG. 1 is a schematic diagram of one exemplary matshup system, in an embodiment.
Figure 2:
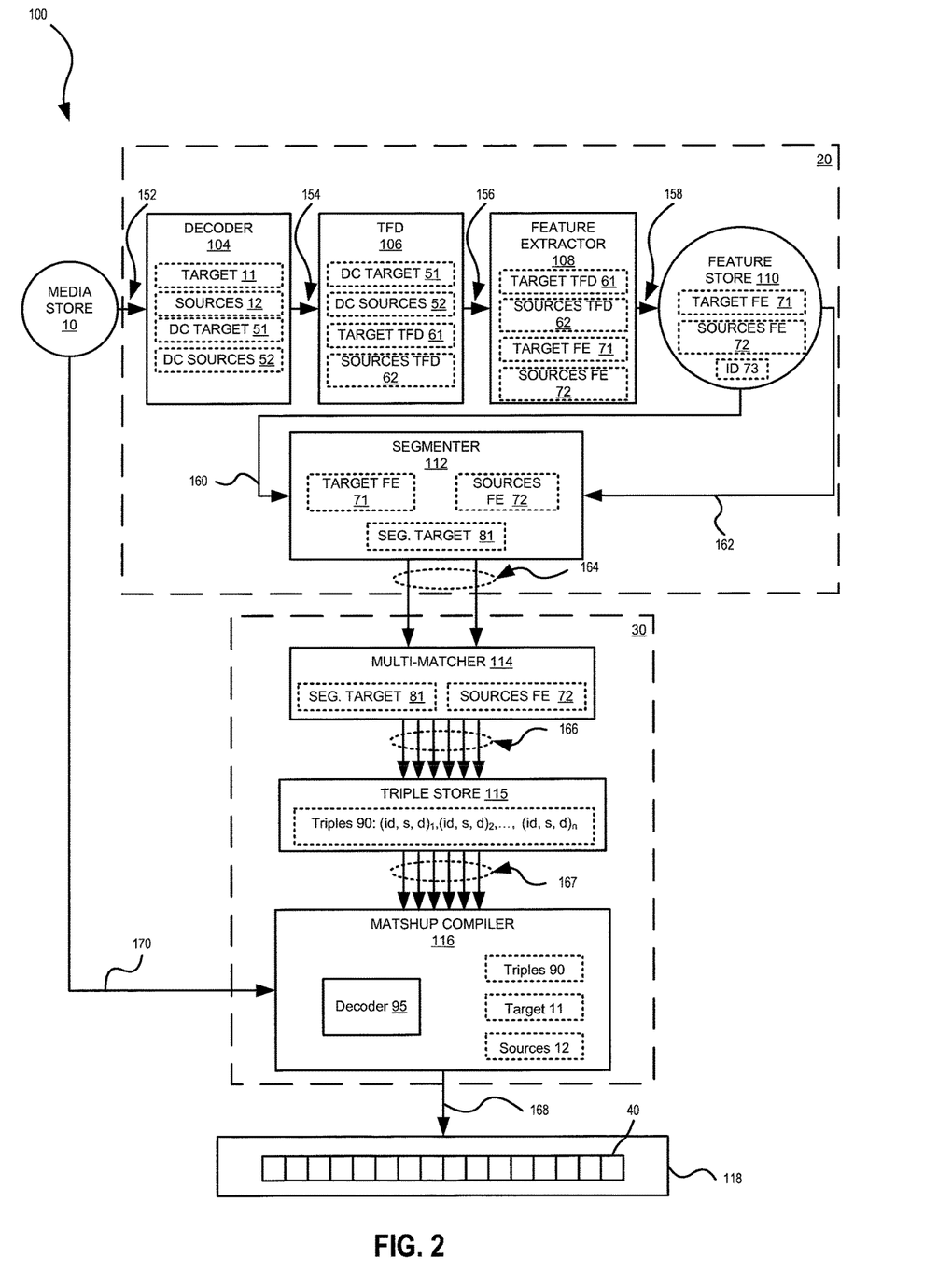
FIG. 2 is a block diagram of the matshup system of FIG. 1, showing greater detail.
Figure 3:
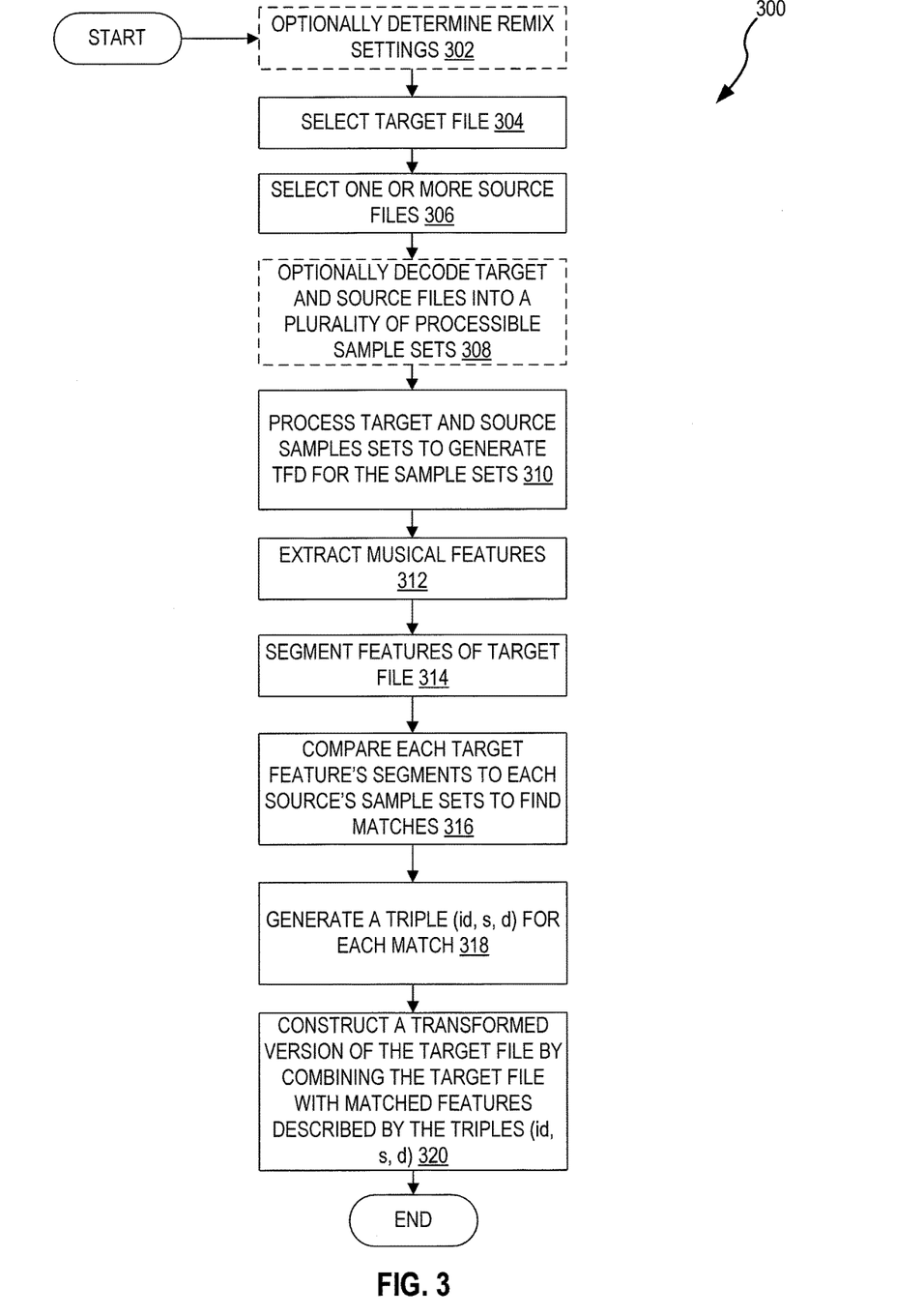
FIG. 3 is a flow chart illustrating one exemplary process of the matshup system of FIGS. 1 and 2.
Figure 4:
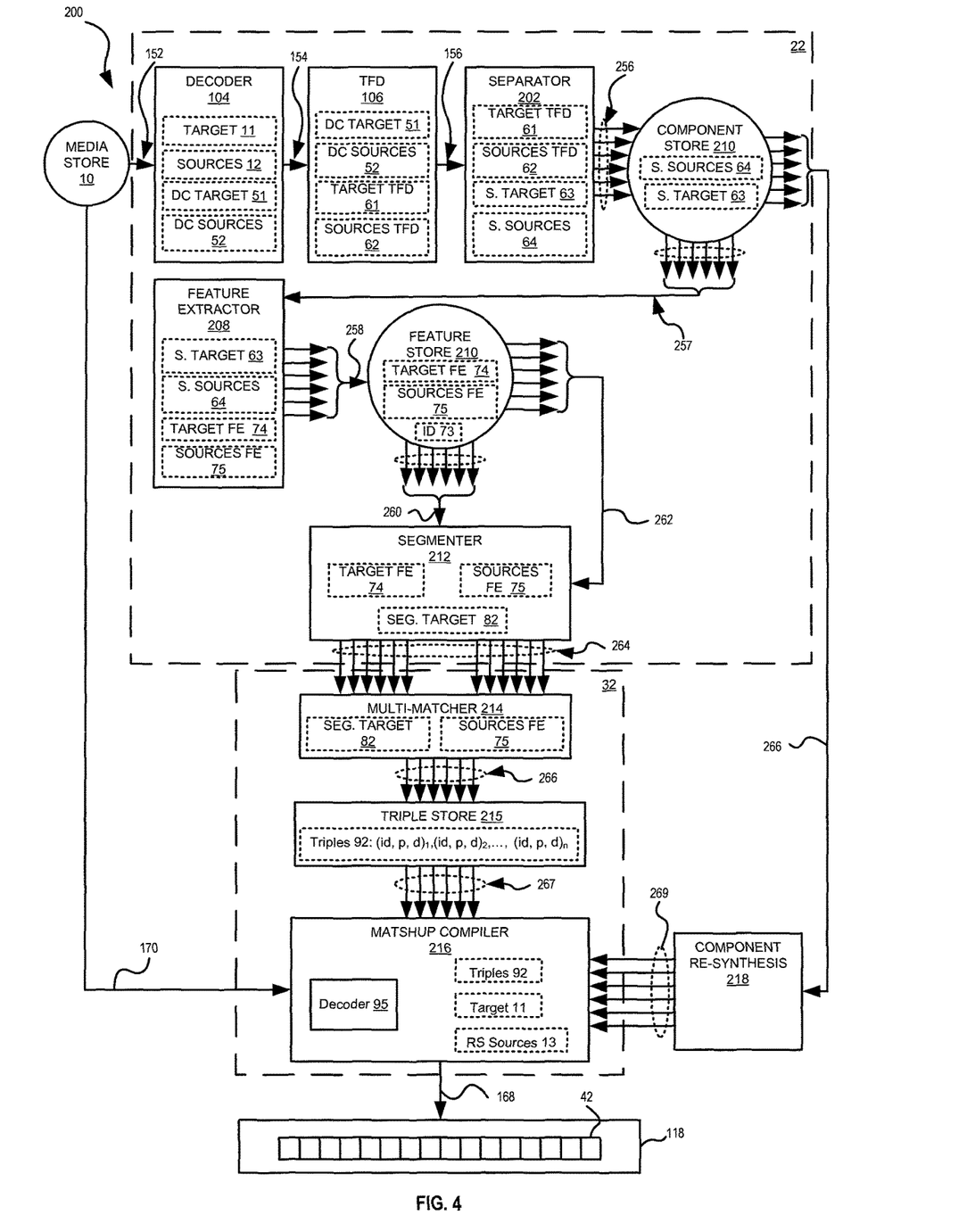
FIG. 4 is a block diagram illustrating an exemplary advanced matshup system, in an embodiment.
Figure 5:
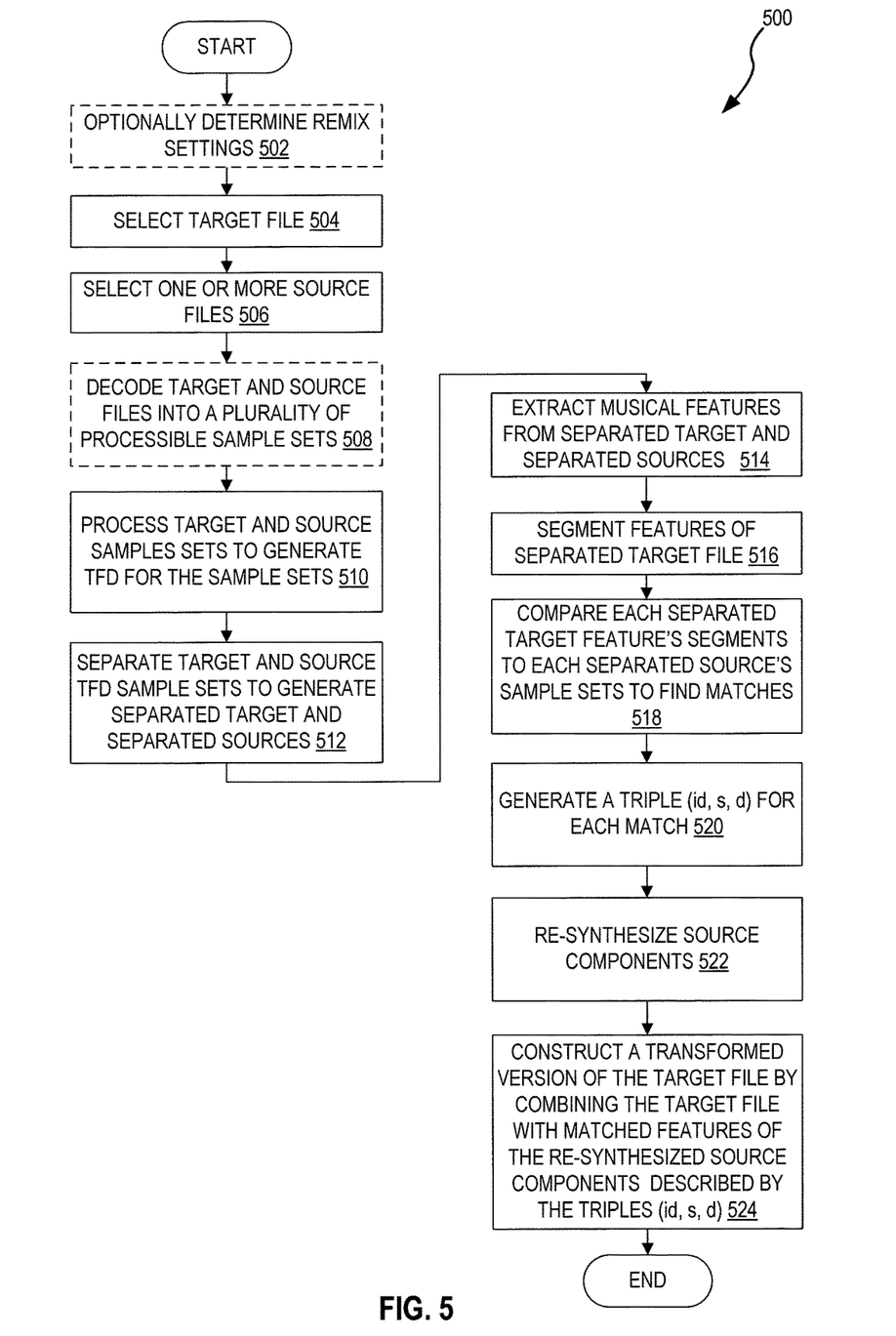
FIG. 5 is a flow chart illustrating one exemplary process of the advanced matshup system of FIG. 4.

FIGS. 1, 2, and 3 show a base matshup system and method and their arrangement in a reduction to practice. An extension of the base matshup system and methods to better approximate the underlying audio sources in a mixture of sources using latent component analysis, feature extraction, sparseness, grouping by role clustering, audio matching and re-combination and re-synthesis of audio to form a component-wise matshup is shown in FIGS. 4 and 5.

Audio Time-Series Matching

FIG. 1 is a schematic diagram of one exemplary matshup system 100 for automatically remixing digital media from two or more digital media files (e.g., target 11, sources 12) to form a transformed digital media 40. System 100 is implemented on a computing device, such as a mobile phone, a portable digital music player, and a desk top computer. Transformed digital media 40, target 11 and sources 12 represent stored digital media, such as found on digital music players or digital video player, known in the art. System 100 includes a media store 10 for storing digital media, a pre-processor 20 for extracting musical features from digital media, and a matshup processor 30 for matching and compiling closely related features. Media store 10, pre-processor 20 and matshup processor 30 cooperate to produce transformed digital media 40.

Target 11 is any digital media selected by a user, or selected by an algorithm such as most-played-track, for remixing with one or more sources 12 to form transformed digital media 40. First source 13 through Nth source 19, collectively called sources 12, represent N digital media sources that may be selected by the user (or optionally by a source selection algorithm) for augmenting target 11 to form transformed digital media 40. Target 11 is automatically augmented with features selected from sources 12. Optionally, features of target 11 may be replaced with features from selected sources 12.

Pre-processor 20 processes target 11 and the one or more selected source digital media from sources 12 to extract and store features of the digital media. Extracted features are utilized in the matching process performed in the matshup processor 30. Pre-processor 20 also segments target 11's extracted features into granulated temporal portions. For example, where target 11 represent audio of 2 minute duration, pre-processor 20 may segment target 11 into 120 one second duration temporal portions or segments. Temporal portions or segments may have other durations (e.g., between 100 milliseconds and 30 seconds, 2-5 seconds typically) without departing from the scope hereof.

Each target 11 and sources 12 are analyzed and information is extracted and stored, for example within at least one matrix m×n, where rows represent m identified features within the audio and columns represent n temporal portions into which target 11 and sources 12 are segmented. For example, where target 11 is 120 seconds in duration and includes four identified features, and the frame rate of a Time-Frequency Distribution (TFD) analyzer (e.g., Time-Frequency Distribution (TFD) analyzer 106, FIG. 2) produces 10 frames per second, for example, the m=4 and n=1200 for a segmentation process configured with one second temporal non-overlapping portions. The segments may also overlap by, for example, 50%. In the 50% overlapping example, m=4 and n=2400 for the same segmentation process. Target 11 is thus divided up into 120 temporal portions, each consisting of 10 frames of a TFD, such that each musical feature stored in the m-rows is divided into 120 time-aligned, contiguous portions and stored in the appropriate nth column of target 11's 4×120 matrix. Two or more of these matrices may be processed by matshup processor 30. Entries in the m rows and the n columns may be reversed, that is the m rows may store the temporal portions and the n columns may store the identified features, without departing form the scope herein.

Matshup processor 30 automatically matches features of target 11 with features of sources 12. In one example of operation, matshup processor 30 compares each feature of target 11 with features of sources 12 (stored as rows in target 11 and sources 12 matrix) to identify matches. Matching may be performed for example by forming probability weighted matches of target 11 segments with features of sources 12 based on a distance function, described in more detail below. This type of comparison algorithm may be based, at least in part, on user optimizations. Finally, matshup processor 30 retrieves target 11 and matched features of sources 12 from media store 10 and forms transformed digital media 40 from target 11 and the most likely (probability weighted) matches found in sources 12. System 100 is described in more detail in FIG. 2.

FIG. 2 shows one exemplary block diagram showing a more detailed description of matshup system 100, FIG. 1. In this embodiment pre-processor 20 is shown with a decoder 104, a Time-Frequency Distribution (TFD) analyzer 106, a feature extractor 108, a feature store 110, and a segmenter 112. Matshup processor 30 is shown with a multi-matcher 114, a triple store 115, and a matshup compiler 116. Sources 12, which include a 1$^{st}$ source 13 through an N$^{th}$ source 19, and target 11 are not shown in media store 10 for clarity of illustration.

In one example of operation, a user selects both a target 11 and a set of sources 12 (each of target 11 and sources 12 may be referred to herein as digital media files) for processing by system 100, the goal of which is to reconstruct the target 11 using recognizable segments from the sources 12 to form a transformed digital media 40. In one embodiment, system 100 may automatically select sources 12 using an algorithm, for example selecting most-played-track(s), and may automatically select target 11.

Selected target 11 and sources 12 are passed 152 to pre-processor 20. If one or more of target 11 and sources 12 are compressed or stored in a format pre-processor 20 is unable to process, then they are passed 152 to and decoded by a decoder 104, which decodes target 11 and sources 12 into decoded (DC) target 51 and decoded (DC) sources 52, for processing by pre-processor 20, each formed of a series of samples sets. In the example of FIG. 2, decoder 104 decodes target 11 and sources 12 to generate DC target 51 and DC sources 52 that include sample sets (time series of sample frames) of uncompressed pulse-code modulated audio information in mono, stereo or multi-channel format for each digital media. Decoder 104 passes 154 DC target 51 and DC sources 52 to TFD 106.

The sample sets of DC target 51 and DC sources 52 are processed by TFD 106, yielding target TFD 61 and sources TFD 62, each of which is a sample set based time-frequency distribution for its respective digital media. In one example, time-frequency distributions (TFDs) are representations the energy density of a signal simultaneously in time and frequency. Examples of TFD 106 processing techniques include a short-time Fourier transform, a full-rate band-pass filterbank decomposition, wavelet analysis, and a Wigner-Ville decomposition. Target TFD 61 and sources TFD 62 is passed 156 to feature extractor 108.

Feature extraction 108 (described in detail in U.S. Pat. No. 6,321,200,) processes the target TFD 61 and sources TFD 62 to extract musical features in each sample set yielding target Frequency Extraction (FE) 71 and source Frequency Extraction (FE) 72. The extracted features are, for example, coefficients used in the matching process (see below). In the present embodiment, target FE 71 and sources FE 71 include a frequency time-series contiguous sample sets for each extracted musical feature contained within the respective digital media file. In the present embodiment, musical features in target FE 71 and sources FE 72 may include: constant-Q frequency re-binning to map linear frequency FFT frames to logarithmic frequency constant-Q spectral bands, Mel-frequency cepstral coefficients (MFCCs), cepstral coefficients (e.g., a full set of 80+ coefficients, which differs from the typical extraction of 13 or 20 coefficients), and pitch-class profiles (chroma) yielded by folding the energy in the constant-Q spectrum into bins corresponding to equal-temperament pitch classes in Western tonal music.

The folding sums all octave-equivalent pitches onto a single octave provide a profile of pitch usage in the sample set. At this stage, power features may also be extracted. Power features may be used to detect silent passages and to balance the audio output at a matshup compiler 116 stage. Further information of the use of automatic feature extraction and audio matching using multi-dimensional time series are contained in, Casey, M. et al. (2003) "Sound replacement, beat unmixing and audio mosaics: content-based audio processing with MPEG-7"; Casey, M. (2004) "Sound-Spotter—software external for PureData computer music environment, system for live audio matching in performance"; Casey, M. et al. (2007) "Soundspotter and REMIX-TV: fast approximate matching for audio and video performance"; Casey et al. (2006) "Song Intersection by Approximate Nearest Neighbour Searching"; Casey et al. (2006) "The Importance of Sequences in Music Similarity," each of which is incorporated herein by reference.

Target FE 71 and sources FE 72 are then passed 158 to feature store 110 (e.g., a database or file-system) to be stored along with a media ID 73 such that extracted musical features are associated with its corresponding digital media file (e.g., target 11, sources 12). Having target FE 71 and sources FE 72 stored in feature store 110 constitute a cache, for example, stored in secondary storage, that may be used at a later time, thus bypassing decoded 104, TFD 106 and feature extractor 108 for previously pre-processor 20 processed digital media. Additionally or alternatively, target FE 71, sources FE 72, and media ID 73 may be stored in media store 10 for long term storage. Prior to processing by matshup processor 30, target FE 71 is passed 160 to segmenter 112 and sources FE 72 is passed 162 to segmenter 112. In one embodiment, where sources FE 72 are not processed by segmenter 112, sources FE 72 are passed from feature store 110 to multi-matcher 114.

Segmenter 112 segments target FE 71 into temporal segments, for example, consisting of a few beats (if using beat tracking) or a few second (if using periodic segmentation), yielding segmented target 81. The segment type (beats or seconds) and size (e.g., one beat, 0.5 seconds, etc.) utilized by segmenter 112 may be set by default during manufacturing of system 100 or controllable by the user. The segmented target 81 and the source FE 72 are then passed 164 to the multi-matcher 114 of matshup processor 30. In the separate embodiment where sources FE 72 are not passed from feature store 110 to segmenter 112 but instead passed from feature store 110 to multi-matcher 114, and only segmented target 81 is passed from segmenter 112 to multi-matcher 114.

In one embodiment, when a new media source (e.g., a digital media file) is stored on matshup system 100, a background feature-extraction service (not shown) processed the new media source to automatically extract musical features without requiting activation by the user. This background feature-extraction service may utilize at least one or more of decoded 104, TFD 106, feature extractor 108, feature store 110, segmenter 112 and media store 10 to perform a background feature-extraction service process on source 14.

Multi-matcher 114 determines the closest matches of musical features in segmented target 81 with musical features in sources FE 72, that is, given a target track (selected by the user or by an algorithm) a mashup is generated automatically by fast content-based searching using the features. One example of finding a closest match is multi-matcher 114 implementing a distance function, to find near neighbor time-series for segmented target 81's feature time-series and sources FE 72 sample set feature time-series. One example of a distance function is the Normed Euclidean distance function. The dot product form of the Euclidean-squared distance function is, $$d^2(x, y) = \|x\| + \|y\| - \left(\frac{2}{\|x\|\|y\|}\right)(x \cdot y),$$

where (x·y) is the vector dot product of vectors x and y, and ‖x‖ and ‖y‖ are the Euclidean norms (L2 norms) of vectors x and y respectively.

If the vectors are unit-normed, which is some embodiments they are, the above equation reduces to, $$d^2(x,y) = 2 - 2(x \cdot y).$$

The above distance function equations define the distance function between two time-series, x and y, consisting of a sequence of l vectors of d-dimensional features. In one example, this is done by comparing one segment of one feature of segmented target 81 against all the sample sets for the same feature in sources FE 72 using a multi-dimensional time-series matching. For systems with fast memory access in secondary storage, the data may be accessed in secondary storage.

Alternatively, for systems where secondary storage has high latency seek times and low throughput, the sources FE 72 are moved to a primary storage. One exemplary distance measure is a normed Euclidean distance that is implemented as a recursive matched filter yielding an O(N) algorithm in the size of sources FE 72. Alternatively, approximate matching using locality sensitive hashing (LSH) enables musical feature matching to a much larger source databases (not shown), in real time. The length of the sequences to be matched may be determined by the user, who, in an embodiment, controls the segment size of segmenter 112. In addition, the search algorithm(s) utilized by matshup processor 30 may include unique aspects, for example, recursive matched filtering over sequences of features, memorization of partial sums for speeding up processing, use of locality sensitive hashing for sublinear-time lookup, and automatic setting of locality-sensitive hashing parameters from media statistics for fast (real-time) search and playback.

The novel aspect of the multi-matcher is that it maintains a sort of the closest matches and outputs each match as a (id, s, d) triple 90. Here the id is the corresponding source media identifier, ID 73, s is a location (for example, offset in milliseconds or beats) of the matched feature within the associated digital media file identified by ID 73, and d is the distance of the match to the target segment within segmented target 81 for a current target time location (t). Triples 90 are passed 166 to triple store 115. Triple store 115 may store triples 90 for later use or may pass 167 triples 90 to matshup compiler 116 for use in constructing transformed digital media 40 from target 11 and sources 12 matched features.

Recombination of Sequences

The matshup automatic mixing algorithm is a probabilistic algorithm. A plurality of feature from a plurality of sources 12 are mixed at each instant in the mashup (matching the target 11 track) to generate transformed digital media 40. Each feature is automatically scaled by its distance from the target 11 by a probabilistic weight derived from the distance function calculated by the multi-matcher 114, above. In one embodiment, scaling is selecting the volume of a mixed feature proportional to a probabilistic weight (one example of which is the probabilistic mixing algorithm, below) derived from the distance function. When mixing, for example, two extracted features with one temporally segmented portion of a target (e.g., a segment of target 11), the mixing process avoids one error that may occur, switching back and forth between the two features, which can result in an unconvincing mashup. Instead, the two features are be mixed together at volumes proportional to their distance from the target.

Forming transformed digital media 40 utilizing matshup compiler 116 involves (1) retrieving, from media store 10, all the relevant media corresponding to a segment of target 11 at a time (t) and the portions of sources 12 which have been determined, by multi-matcher 114 and described by the triples 90, to match that segment, (2) decoding, for example, with decoder 95, the corresponding target 11 segment and sources 11 sample sets and (3) applying a mixing algorithm (described below), to combine the target 11 segments with the corresponding sources 12 sample sets. The probabilistic mixing algorithm is of the following form:

$$p_n = e^{(-bd_n)} / \sum_i e^{(-bd_i)},$$

which assigns a probabilistic weighting p to each source based on the distance d from target 11 at a time (t). The distance is computed using the multi-dimensional time-series distance function described on the Equation above. The user can control the degree of stiffness (b) of the probability distribution with a user interface, with high b corresponding to selecting the maximum probability components and low b corresponding to equal weight to all sources. In one embodiment, values for b are in the range 0.5 to 20.0.

The recombination process performed by matshup compiler 116 requires only the digital media and the passed 166 match triples, which admits the possibility for caching matshups and sharing them with other users who have the same media on their devices. Thus, the recombination process executed by multi-matcher 116 is a process which may be performed separate from the processes performed by pre-processor 20 and multi-matcher 114. It takes as inputs the passed 167 triples, called a matshup description file (MDF) and a stiffness parameter b for controlling the mixing.

The resulting audio matshup, transformed digital media 40, is passed 168 to the audio output buffer 118 to continue an ongoing audio stream or may be stored in media store 10 for later use. In one example, the entire process executes in less time than it takes for the audio corresponding to a segment to drain from the audio output buffer 118, thus it is a real-time system. Alternatively, the audio may be written to a media store 10, after encoding the audio buffers into one of the device's supported formats (e.g. mp3, aac).

FIG. 3 is a flow chart illustrating one exemplary process 300 of matshup system 100 for converting a target and one or more sources into a transformed media.

In step 302, a user may optionally determine remixing settings. One example of determining remix settings is a user selecting segment type (beats or seconds) and size (e.g., one beat, 0.5 seconds, etc.) which is utilized by segmenter 112, FIG. 2. Step 302 then moves to step 304, where a target file is selected. A target file, e.g., target 11, may be selected by a user or selected automatically. Step 304 then moves to step 306 where one or more source files are selected. The one or more source files may be selected automatically via an algorithm, such as most played file(s). Step 306 then moves to optional step 308 where one or both of the target file and the sources file are decoded into processible sample sets. One example of target and source files being decoded is target 11 and sources 12 decoded to generate DC target 51 and DC sources 52. Step 308 then moves to step 310.

In step 310 the target and sources files are processed to generate a time frequency distribution file for each of the target file and the source files. One example of step 310 is Time-Frequency Distribution (TFD) analyzer 106 processing DC target 51 and DC sources 52 to generate target TFD 61 and sources TFD 62. Examples of TFD 106 processing techniques include a short-time Fourier transform, a full-rate band-pass filterbank decomposition, wavelet analysis, and a Wigner-Ville decomposition. Step 310 then moves to step 312.

In step 312, musical features are extracted from the Time-Frequency Distribution analyzed target and sources. One example of step 312 is feature extractor 108 extracting musical features from TFD target 61 and TFD sources 62 to generate target FE 71 and sources FE 72. Step 312 then moves to step 314.

In step 314 feature extracted target is segmented into temporal portions. One example of step 314 is segmenter 112 segmenting target FE 71 into 'n' temporal portions to generate seg. target 81. Step 314 then moves to step 316.

In step 316 each target feature segment is compared to each sources sample set to find matches. One example of step 316 is multi-matcher 114 comparing seg. target 81 with sources FE 72 to determine matches. Step 316 then moves to step 318 where triples are generated according to the matches determined in the previous step. One example of generating triples is generating triple 90 (id, s, d) where 'id' corresponds to a source media identifier, 's' corresponds to a location (for example, offset in milliseconds or beats) of the matched feature within the source, and 'd' is a "distance" of the match between the target and the source generated by a distance function. Step 318 then moves to step 320.

In step 320 a transformed version of the target is generated by combining the target file with matched features described by the triples. Process 300 then ends.

FIG. 4 is a block diagram showing exemplary detail of an advanced matshup system 200. System 200 expands on the base matshup system 100, for example, by separating components in audio source separation and perfolining musical role clustering.

Advance matshup system 200 includes a media store 10, similar to media store 10 of FIGS. 1 and 2, a preprocessor 22, and a matshup processor 32 to generate a transformed digital media 42.

Preprocessor 22 includes a decoder 104, similar to decoded 104 of FIG. 2, a TFD 106, similar to TFD 106 of FIG. 2, a separator 202, a component store 210, a feature extractor 208, a feature store 210 and a segmenter 212. Feature extractor 208, feature store 210 and segmenter 212 are similar to feature extractor 108, feature store 110 and segmenter 112 with the exception that feature extractor 208, feature store 210 and segmenter 212 take as inputs, output and process and store audio files (e.g., target 11 and sources 12) that have been decomposed by a separator 202, into separate components based on audio sources, which are grouped into musical roles corresponding to tracks. In an embodiment, separator 202 decomposes the audio into separate components, separated target 63 and separated source 64, based on audio sources and groups them into musical roles corresponding approximately to "tracks" in a musical recording (e.g., vocal track, percussion track, bass track, harmony track, etc.). In the present embodiment, separator 202 utilizes sparcity filtering novelly applied to Probabilistic Latent Component Analysis (PLCA) (Smaragdis, P. & Raj, B. [2007], U.S. Pat. No. 7,318,005 granted Jan. 8, 2008). Applying a sparcity filter creates coherent groups of components delineated, for example, by percussive and non-percussive roles. The separated target 63 and separated source 64 are passed 256 to, and stored in, component store 210. Component store 210 passes 257 separated target 63 and separated source 64 to feature extractor 208 and passes 266 separated target 63 and separated source 64 to a component re-synthesis 218, which re-synthesizes each separated component of source 11 into a re-synthesized (RS) source 13 utilizing, for example, an inverse TFD transform. Feature extractor 208 processes the separated target 63 and separated source 64 to extract musical features in each "track," yielding target Frequency Extraction (FE) 74 and source Frequency Extraction (FE) 75, similarly to the process utilized by feature extractor 108 of FIG. 2, with the difference being feature extractor 208 extracts features from each track of separated target 63 and separated source 64. Extracting features from each track in this way eliminates unwanted musical features from the final transformed digital media 42. Feature Extractor 208 then passes 258 target FE 74 and source FE 75 to feature store 210.

Feature store passes 260 target FE 74 and 262 source FE 75 to segmenter 212. Optionally, feature store 210 may pass sources FE 75 to matshup processor 32 because sources FE 75 are not segmented by segmenter 212. Segmenter 212 segments target FE 74 into n-temporal portions and stores them into a matrix (e.g., an m×n matrix) as segmented target 82. Segmenter 212 is similar to segmenter 112 with the exception that segmenter 212 temporally segments each "track" extracted feature, extracted from each "track" or musical role of target FE 74 and sources FE 75, thereby generating more m-rows in the m×n matrix of segmented target 82.

Segmented target 82 and optionally, sources 75 are passed 264 to multi-matcher 214 of matshup processor 32. Multi-matcher 214 is similar to multi-matcher 114, with the exception that multi-matcher 214 processes segmented target 82 and source FE, which have been separated by separator 202 in an earlier step. In a separate embodiment multi-matcher 214 is the same as multi-matcher 114. Multi-matcher 214 generates triples 92 which are passed 266 to and stored in triple store 215, which is similar to triple store 115.

Triples 92 are then passed 267 to matshup compiler 216, which also takes as inputs target 11 passed 170 from media store 10 and RS source 13 from component re-synthesis 218. With the exception that matshup complier 216 utilizes triples 92 and RE sources 13, matshup compiler 216 generates transformed digital media 42 similar to matshup compiler 116.

FIG. 5 is a flow chart illustrating one exemplary process 500 of advanced matshup system 200, FIG. 4, for converting a target and one or more sources into a transformed media. FIG. 5 is best viewed in combination with FIG. 4.

In step 502, a user may optionally determine remixing settings. One example of determining remix settings is a user selecting segment type (beats or seconds) and size (e.g., one beat, 0.5 seconds, etc.) which is utilized by segmenter 212, FIG. 4. Step 502 then moves to step 504, where a target file is selected. A target file, e.g., target 11, may be selected by a user or selected automatically. Step 504 then moves to step 506 where one or more source files are selected. The one or more source files may be selected automatically via an algorithm, such as most played file(s). Step 506 then moves to optional step 508 where one or both of the target file and the sources file are decoded into processible sample sets. One example of target and source files being decoded is target 11 and sources 12 decoded to generate DC target 51 and DC sources 52. Step 508 then moves to step 510.

In step 510 the target and sources files are processed to generate a time frequency distribution file for each of the target file and the source files. One example of step 510 is Time-Frequency Distribution (TFD) analyzer 106, FIG. 4, processing DC target 51 and DC sources 52 to generate target TFD 61 and sources TFD 62. Examples of TFD 106 processing techniques include a short-time Fourier transform, a full-rate band-pass filterbank decomposition, wavelet analysis, and a Wigner-Ville decomposition. Step 510 then moves to step 512.

In step 512, TFD target file and TFD source file are separated into "tracks" to generate a separated target file and a separated source file. One example of step 512 is separator 202, FIG. 4, processing target TFD 61 and sources TFD 62 to generate s. target 63 and s. sources 64. Step 512 then moves to step 514.

In step 514, musical features are extracted from the separated Time-Frequency Distribution analyzed target and sources. One example of step 514 is feature extractor 208 extracting musical features from s. target 63 and s. sources 64 to generate target FE 74 and sources FE 75. Step 514 then moves to step 516.

In step 516 feature extracted target is segmented into temporal portions. One example of step 516 is segmenter 212 segmenting target FE 74 into 'n' temporal portions to generate seg. target 82. Step 516 then moves to step 518.

In step 518 each target feature segment is compared to each sources sample set to find matches. One example of step 518 is multi-matcher 214 comparing seg. target 82 with sources FE 75 to determine matches.

Step 518 then moves to step 520 where triples are generated according to the matches determined in the previous step. One example of generating triples is generating triple 92 (id, s, d) where 'id' corresponds to a source media identifier, 's' corresponds to a location (for example, offset in milliseconds or beats) of the matched feature within the source, and 'd' is a "distance" of the match between the target and the source generated by a distance function. Step 520 then moves to step 522.

In step 522 source components are re-synthesized. One example of step 522 is component re-synthesis 218, FIG. 4, performing an inverse short-time Fourier transform on s. sources 64 to generate RS sources 13. Step 522 then moves to step 524.

In step 524 a transformed version of the target is generated by combining the target file with matched features described by the triples. Process 500 then ends.

In one embodiment, a uni-match system performs sequence-of-feature similarity matching as follows. Each target media (e.g. target 11) is processed by, e.g., system 200, such that the processed target media is segmented into $X_i$ target segments, with i being an integer from 0 to N, the length of each $i^{th}$ segment is selectable from, for example, 0.25 to 1.0 seconds, and each segment has an selected overlap of, for example, 0.125 to 0.5 seconds. A sequence of processed target spectral features (e.g. MFCC), extracted by a feature extractor (e.g., Feature Extractor 208), are formed into unit vectors. The same operation occurs for the group of source media (e.g., sources 12) or the entire database, represented by $Y_j^{(k)}$, where k is an integer which represents a song and j is an integer which represents a segment within the $k^{th}$ song. Optionally, the results may be stored locally to decrease processing time in subsequent matshups.

During execution, a distance function (e.g., a normed-Square Euclidean distance function) computes a distance between a target segment, $X_i$, and all of the source media (e.g., sources 12), $Y_j^{(k)}$. In the present uni-match system, the winning segment, that is, the closest match as calculated by the distance function, is selected to be mixed with the $X_i$ segment of the target.

In another embodiment, an algorithm, similar to that in the embodiment described above, outputs a plurality 'P' of closest matches for each target segment. For each of the 'P' closest matches, a mixing co-efficient based on the distance function is determined. A mixing algorithm then scales and sums the associated media for each of the closest matches based upon the mixing co-efficient.

In another embodiment, an algorithm similar to the above algorithm, further includes a probabilistic latent component analysis (PLCA) algorithm in combination with a sparsity algorithm to generate a decomposition. The PLCA algorithm extracts latent components from sources prior to extracting spectral features (e.g., MFCC). Each target segment, and source segment, is separated into one of several (e.g., 1 to 20) musical components (e.g., vocals, drum, bass, etc.) corresponding to a latent source within the original mixture. The sparsity algorithm ensures that the only those PLCA process determined components that are not a mixture of sources are included in the decomposition. In one example, where sparsity is measured from 0 to 1, sparsity of each component is determined and, if the sparsity of that component is between a lower threshold, for example, 0.25 and an upper threshold, for example, 0.75, the component is not included for matching. Sparsity may be a measured in the frequency domain or in the time domain. For example, percussive components may be characterized as having impulsive or sparse time marginals and, possibly, non-sparse frequency marginals. On the other hand, melodic and harmonic roles may be characterized as having sparse, or harmonic, frequency marginals and non-sparse smooth time marginals. Using these assumptions on the nature of musical roles, three features are extracted for each of the frequency and time marginals of each component.

Below is a description of utilizing multiple components, instead of features, for matching. For each target segment, each sparseness reduced PLCA component is taken in turn, the closest P matches of components from the source database are found, mixing coefficients applied to each match, and a partial reconstruction of the audio samples (using the spectral features) is summed into the reconstruction based on the mixing co-efficients. This process mirrors the mixing algorithm for multi-match, above, with the difference being this process works on components instead of whole segments (features). That is, this process is performing component-to-component matching across segments. Because the component matches can not be pulled from the source feature, each component match is reconstructed by inverting the PLCA transform. In one example, this is simply an inverse Fourier transform on the individual PLCA component magnitudes phases taken from the original segment.

Figure 6:
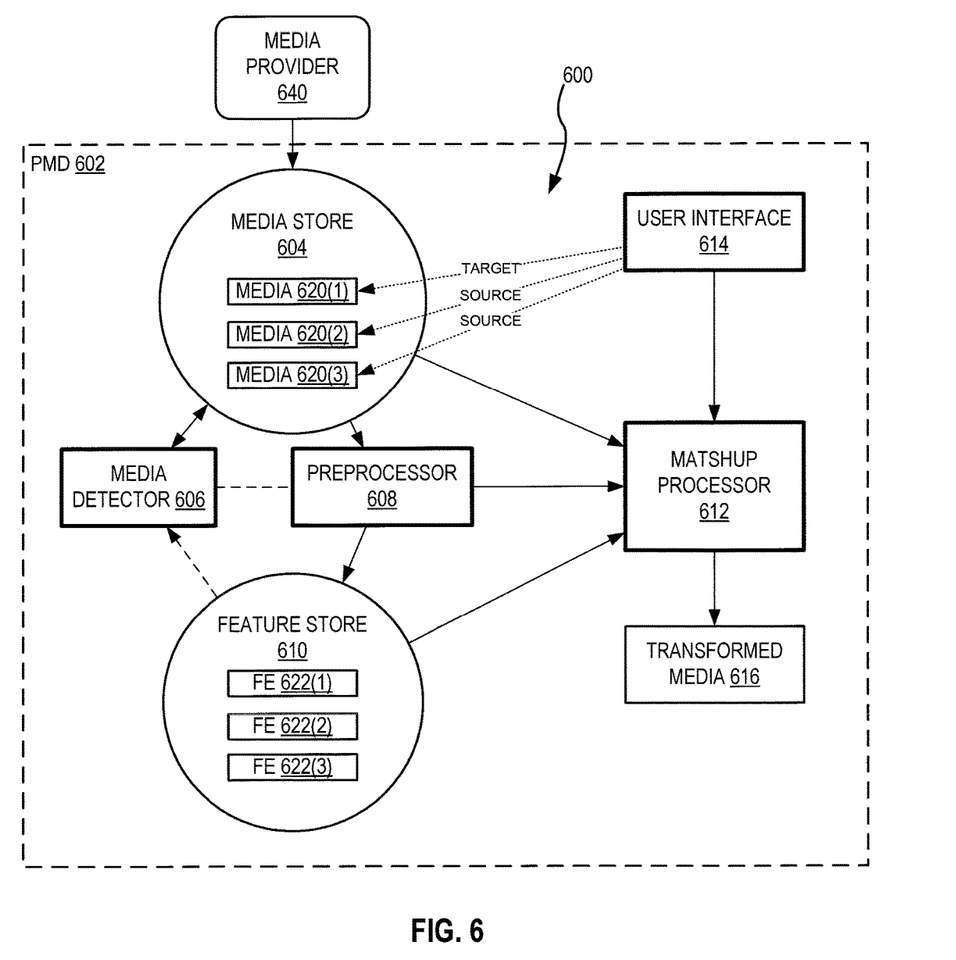
FIG. 6 shows one exemplary media device for automatically remixing digital media, in an embodiment.

FIG. 6 shows one exemplary personal media device (PMD) 602 that includes a matshup system 600 for automatically remixing digital media. PMD 602 may represent any type of media storage and processing device, such as a, a digital media player (e.g., an iPod®), a smart phone (e.g., an iPhone®, an Android®), a media server (e.g., a personal computer), and so on. In one example, matshup system 600 is downloaded onto PMD 602 as a software application (e.g., an app).

PMD 602 includes a media store 604 that stores media 620 for playing on PMD 602. An external media provider 640 may provide media in the form of data files that are downloaded and stored within media store 604 as media 620. Mashup system 600 includes a preprocessor 608 for processing media 620 stored within media store 604 to extract features, FE 622, that are stored within a feature store 610. Specifically, features FE 662(1), 622(2), and 622(3) are generated from media 620(1), 620(2), and 620(3), respectively.

A user interface 614 selects (e.g., by interaction with a user, or automatically using playlists, most played, and/or other media tracking data of PMD 602 using a source selection algorithm) a target media 620(1), and one or more source media 620(2) and 620(3) within media store 604. The example of FIG. 6 shows two source media 620(2) and 620(3), however, more or fewer media 620 may be selected as source media by user interface 614 without departing from the scope hereof. Target 620(1) and sources 620(2) and 620(3) are similar to target 11 and sources 12 of FIG. 1, respectively. Preprocessor 608 may represent preprocessor 20 of FIG. 1 and preprocessor 22 of FIG. 4. Mashup system 600 also includes a media detector 606 that detects media files added to media store 604 that do not have associated feature information 622 within feature store 610. For detected new media files, media detector 606 may invoke preprocessor 608 to automatically generate features information 622 from the detected media 620. In one example, media detector 606 and preprocessor 608 operate in the background of PMD 602 to automatically generate feature information of media 620 added to PMD 602.

Matshup system 600 also includes a matshup processor 612 for processing feature information 622 of feature store 610 and media 618 stored within media store 604 to generate transformed digital media 616. Matshup processor 612 may represent matshup processors 30 of FIGS. 1 and 2, and matshup processor 32 of FIG. 4. Transformed digital media 616 may be stored within media store 604 or may be output in real-time by PMD 602 (e.g., using an audio output device, not shown).

In one example of operation, a user interacts with user interface 614 to select target media 620(1) and source media 620(2) and 620(3). Matshup processor 612 processes feature information 622 associated with selected media 620, to generate transformed digital media 616 from media 620. Matshup processor 612 matches portions of media 620(2) and 620(3) to segments of media 620(1) and mixes the matched portions to form transformed digital media 616. Matchup process 612 may generate transformed media 616 in real time thereby allowing transformed media 616 to be played substantially immediately on PMD 602.

Uni Match $\partial_L^2 = (x_i, y_j^{(k)})$, where $x_i$ is the $i^{th}$ feature vector segment of a target song, x (e.g., a short time spectral frame, $MFCC_{10}$), and $y_j^{(k)}$ is the $j^{th}$ feature vector of the $k^{th}$ source song, y, and L is the sequence length.

$$\overline{X}_i = \frac{[x_i, x_{i+1}, \ldots, x_{i+L}]}{\|[x_i, x_{i+1}, \ldots, x_{i+L}]\|},$$

$$\overline{Y}_j^{(k)} = \frac{[\overline{y}_j^{(k)}, \overline{y}_{j+1}^{(k)}, \ldots, \overline{y}_{j+L}^{(k)}]}{\|[\overline{y}_j^{(k)}, \overline{y}_{j+1}^{(k)}, \ldots, \overline{y}_{j+L}^{(k)}]\|}.$$

Sort $\partial_L^2 = (x_i, y_j^{(k)})$ for the $\overline{y}_j^{(k)}$ closest match (e.g., the P=1 closest match), to $\overline{x}_i$, The inter-sequence distance is;

$$\partial_L^2 = (x_i, y_j^{(k)}) = \partial^2(\overline{X}_i, \overline{Y}_j^{(k)}) = \|\overline{X}_i\| + \|\overline{Y}_j^{(k)}\| - \frac{2}{\|\overline{X}_i\|\|\overline{Y}_j^{(k)}\|} \overline{X}_i \cdot \overline{Y}_j^{(k)}$$

Multi-Match

Sort $\partial_L^2 = (x_i, y_j^{(k)})$ for the $\overline{y}_j^{(k)}$ closest matches (e.g., the P closest matches $\overline{y}_1^{(1)}, \overline{y}_1^{(2)}, \overline{y}_3^{(2)}, \overline{y}_4^{(6)}$, where P=4), to $\overline{x}_i$.

Mixing

The P closest matches are then entered into a mixing algorithm to generate mixing co-efficients. One example of a mixing algorithm is;

$$\alpha_r = \frac{e^{-\beta \partial_L^2 \left(x_i, y_{jr}^{(k_r)}\right)}}{\sum_{r'=1}^{P} e^{-\beta \partial_L^2 \left(x_i, y_{jr'}^{(k_{r'})}\right)}},$$

where r=1, . . . , P, β is the a stiffness co-efficient (e.g., 2 . . . 5), and $\alpha_r$ is the $r^{th}$ mixing co-efficient.

Audio Output $\hat{xx}_i = \sum_{r=1}^{P} \alpha_r \cdot yy_{j_r}^{(k)}$, where $\hat{xx}_i$ is the reconstructed input $xx_i$, $yy_{j_r}^{(k)}$ si the audio samples for song $k_r$ at window position $j_r$.

Component Extraction

Prior art probabilistic latent component analysis $$X_i \rightarrow WZH^T \rightarrow \sum_{m=1}^{U} w_m z_m h_m^T,$$

where U the number of components with m being $m^{th}$ component.

The extension to PLCA includes after each run of n interactions (e.g., n=10 to 1000), matshup processor computes sparseness σ of $w_m \in \Re$.

$$\sigma(w_m) = \frac{\left\{\frac{(\sqrt{r} - \sum |w_m|)}{\|w_m\|}\right\}}{\sqrt{r} - 1}.$$

Then we reject $w_m$ if $t_1 \leq \sigma(w_m) \leq t_2$, where $t_1$ is a lower threshold and $t_2$ is an upper threshold. In one example, $t_1 = 0.3 \pm 0.1$ and $t_2 = 0.7 \pm 0.1$.

PLCA and sparseness selection is applied to the $x_i$ in an iterative process to generate $\{x_i\} = \{x_{i1}, x_{i2}, x_{i3} \ldots , x_{iU_i}\}$. In addition, PLCA and sparseness selection is applied to the $y_j^{(k)}$ in an iterative process to generate $\{y_j^{(k)}\} = \{y_{j1}^{(k)}, y_{j2}^{(k)}, y_{j3}^{(k)}, \ldots , y_{jU_i}^{(k)}\}$. $\partial_L^2 = (x_i, y_j^{(k)})^P$ generates the P closest matches, $\{x_i\}$ and $\forall j \forall k$.

Audio reconstruction via mixing as before, but with components;

$\hat{xx}_i = \sum_{s=1}^{U_i} \sum_{r=1}^{P} \alpha_{s,r} \cdot y_{s,j_r}^{(k_r)}$ where $U_i$ is the total number of s is the source components per $i^{th}$ segment, and P is the closest matching components to s.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for generating a transformed digital media, including:
    decoding a target media file and one or more source media files into a target sample set and a plurality of source sample sets;
    processing the target sample set to form a target time frequency distribution (TFD);
    processing the source sample sets to form at least one source TFD;
    extracting musical features from the target TFD to generate target feature extraction (FE) data containing one or more separate target features selected from the group including: constant-Q frequency re-binning, Mel-frequency cepstral coefficients (MFCCs), cepstral coefficients, and pitch-class profiles (chroma);
    extracting musical features from the source TFD to generate source FE data containing one or more separate source features selected from the group including: constant-Q frequency re-binning, Mel-frequency cepstral coefficients (MFCCs), cepstral coefficients, and pitch-class profiles (chroma), and assigning each of the source features a media ID for identifying the associated source;
    segmenting the target FE data into temporal portions to form a plurality of target feature segments for each target feature, each of the target feature segments being time aligned to a corresponding target feature;
    comparing each of the target feature segments with a plurality of the source features and generating a triple for each substantial match between the target feature segment and one of the source features, the triple including (id, s, d), where id is the media ID, s is a temporal location within the source media, d is the distance of the matched source to the respective target segment; and
    generating the transformed media from the target sample sets and the source sample sets based upon the triples according to a probabilistic mixing algorithm based on a match distance function.

2. A method for generating a transformed digital media from a target media and one or more source media, comprising:
    decoding the target media and the source media;
    generating a first time frequency distribution for the target media and a second time frequency distribution for each of the source media;
    extracting a plurality of first musical features from the first time frequency distribution and a plurality of second musical features from each of the second time frequency distributions, wherein the musical features are selected from the group including: constant-Q frequency re-binning, Mel-frequency cepstral coefficients (MFCCs), cepstral coefficients, and pitch-class profiles (chroma);
    segmenting the first musical features into a plurality of temporal segments;
    comparing the first musical features of each of the plurality of temporal segments with the second musical features to generate substantial matches;
    generating a triple for each of the substantial matches, the triple including (id, s, d), where id is an identifier for the source media, s is a temporal location within the source media, d is the distance of the matched second musical feature to the respective temporal segment; and
    generating the transformed digital media by mixing the target media and portions of the source media identified by the triples.

3. A method for generating a transformed media by re-synthesizing one or more time frequency distribution (TFD) processed media features and combining with a target media, including:
    performing a reverse TFD process on one or more musical features extracted from at least one source media to generate a re-synthesized audio feature having a reduced amount of extraneous audio elements; and combining the re-synthesized audio feature with the target media to generate the transformed media;

wherein the musical features are selected from the group including: constant-Q frequency re-binning, Mel-frequency cepstral coefficients (MFCCs), cepstral coefficients, and pitch-class profiles (chroma); and wherein combining the re-synthesized audio feature with the target media is based on a triple associated with the re-synthesized audio feature, the triple including (id, s, d), where id is an identifier for the source media, s is a temporal location within the source media, d is the distance of the re-synthesized audio feature to the target media.

4. A method for mixing audio of at least one source media with audio of a target media, including:

determining, using locally sensitive hashing (LSH), matches between each of a plurality of time segmented portions of the target media and each of a plurality of time windowed portions of the source media;

generating a probabilistic distribution of N closest determined said matches;

generating, for each of the N closest matches, a mixing coefficient based upon the generated probabilistic distribution;

generating a triple, (id, s, d), for each match, where id is an identifier for the source media, s is a temporal location of the time windowed portion of the source media identified, and d is the determined distance between the time windowed portion and the time segmented portion; and mixing audio of the time windowed portions associated with the N closest matches with audio of the associated time segmented portion using the associated mixing coefficients and triples.

5. The method of claim 4, wherein N is an integer between 2 and 10.

6. The method of claim 5, wherein N is a user defined parameter.

7. The method of claim 4, the step of determining matches comprising determining a distance between each time segmented portion and each time windowed portion using a distance function.

8. The method of claim 7, wherein the distance function is a normed Euclidean distance function.

9. The method of claim 7, wherein the probabilistic distribution is a probabilistic distribution of the distance.

10. The method of claim 7, wherein determining the closest matches is determining the 'N' closest matches.

11. The method of claim 4, wherein each time windowed portion has a period of between one quarter of a second and one second.

12. A method for augmenting a target media with a plurality of source media, comprising the steps of:

processing the target media to form a target time frequency distribution (TFD);

processing each of the source media to form a plurality of source TFDs;

extracting target features from the target TFD;

extracting source features from each of the source TFDs;

segmenting the target features into temporal portions to form a plurality of target feature segments;

comparing each of the target feature segments with each of the plurality of source features to determine a matched source feature having a nearest match between each one of the source features and a respective one of the target feature segments;

generating, for each matched source feature, a triple having an id representing an ID of the source media, an s representing a temporal location of the matching feature within the source media, and a d representing the distance between the matched target feature segments and source feature; and mixing portions of audio of the source media associated with said matched source features with audio of the target media to form an augmented target media, wherein the mixing is based upon the triples of the matched source features and a probabilistic mixing algorithm that uses the distance between the matched target feature and source feature to define an amplitude of each said portion of the source media;

wherein the target features and the source features are selected from the group including: constant-Q frequency re-binning, Mel-frequency cepstral coefficients (MFCCs), cepstral coefficients, and pitch-class profiles (chroma).

13. The method of claim 12, wherein the distance is determined by a distance function, the target feature and the source feature.

14. A method for augmenting a target media with a plurality of source media, comprising the steps of:

processing the target media to form a target time frequency distribution (TFD);

separating the target TFD into a plurality components;

extracting target features from each of the components;

processing each of the source media to form a plurality of source TFDs;

separating each of the source TFDs into a plurality of source components;

extracting source features from each of the source components;

segmenting the target features into temporal portions to form a plurality of target feature segments;

comparing each of the target feature segments with each of the source features to determine N closest matches;

generating a triple, (id, s, d), for each of the N closest matches, where id is an identifier for the source media, s is a temporal location of the time windowed portion of the source media identified, and d is the determined distance between the time windowed portion and the time segmented portion; and mixing first audio portions of the target media corresponding to the target feature segment and second audio portions of the source media corresponding to the source segments of the N closest matches using the triples;

wherein the target features and source features are selected from the group including: constant-Q frequency re-binning, Mel-frequency cepstral coefficients (MFCCs), cepstral coefficients, and pitch-class profiles (chroma).

15. The method of claim 14, the step of separating each of the source TFDs comprising processing each of the source TFDs using probabilistic latent component analysis.

16. The method of claim 14, further comprising generating a sparseness for each of the source features, wherein source features having said sparseness greater than a first threshold and less than a second threshold are ignored.

17. The method of claim 16, wherein said sparseness has a range of between 0 and 1 and said first threshold has a range of between 0.2 and 0.4 and said second threshold has a range of between 0.6 and 0.8.

18. A system for automatically remixing digital music, comprising:

a time-frequency distribution analyzer for processing (a) a target media to form a target time frequency distribution and (b) a plurality of source media to form a plurality of source time frequency distributions;

a feature extractor for (a) extracting target features from the target time frequency distribution and (b) extracting source features from each of the source time frequency distributions;

a feature store for storing the target features and the source features;

a segmenter for segmenting the target features into a plurality of temporal target segments;

a matcher for matching, for each temporal target segment, a plurality of the source features nearest to the temporal target segment to form a match;

a triple generator for generating, for each match, a triple having an id representing an ID of the source media, an s representing a temporal location of the matching feature within the source media, and a d representing the distance between the matched temporal target segment and source feature;

a compiler for generating a transformed digital media based upon the target media and the matched source features using the triples;

wherein the target features and source features are selected from the group including: constant-Q frequency re-binning, Mel-frequency cepstral coefficients (MFCCs), cepstral coefficients, and pitch-class profiles (chroma).

19. The system of claim 18, wherein the time-frequency distribution analyzer, feature extractor, and segmenter, process the target media and each source media only once.

20. The system of claim 18, the matcher, and the compiler, cooperating to generate the transformed digital media in real time.

21. The system of claim 18, further comprising:
a media store for storing the target media and the source media; and
a media detector for detecting media newly added to the store and initiating preprocessing of that media by one or more of the time-frequency distribution analyzer, the feature extractor, and the segmenter.

22. The system of claim 18, further comprising a user interface for allowing the user to select one or more of the target media and the plurality of source media.

23. The method of claim 1, wherein the temporal location (s) is an offset in the source media measured in milliseconds or beats.

24. The method of claim 2, wherein the temporal location (s) is an offset in the source media measured in milliseconds or beats.

25. The method of claim 3, wherein the temporal location (s) is an offset in the source media measured in milliseconds or beats.

26. The method of claim 4, wherein the temporal location (s) is an offset in the source media measured in milliseconds or beats.

27. The method of claim 12, wherein the temporal location (s) is an offset in the source media measured in milliseconds or beats.

28. The method of claim 14, wherein the temporal location (s) is an offset in the source media measured in milliseconds or beats.

29. The system of claim 18, wherein the temporal location (s) is an offset in the source media measured in milliseconds or beats.

* * * * *